United States Patent Office 2,892,782
Patented June 30, 1959

2,892,782

MIXTURES OF METAL SALTS OF ORGANIC HYDROXY COMPOUNDS

James M. Caffrey, Jr., Beacon, N.Y., assignor to Texaco Inc., a corporation of Delaware No Drawing. Application August 29, 1955
Serial No. 531,264

5 Claims. (Cl. 252—42.7)

This invention relates to an improvement in the manufacture of mixtures of metal salts of organic hydroxy compounds. More particularly, this invention relates to a method of forming mixtures of metal salts of aliphatic alcohols and mixtures of metal salts of alkylated hydroxy aromatic compounds. Mixtures of this latter type compound are known to have extremely good detergent properties in mineral lubricating oils as disclosed in U.S. Patent 2,674,577, issued April 6, 1954 to Frederic C. McCoy, Bill L. Benge, Edwin C. Knowles and Charles C. Towne.

It is well known in the art that individual metal salts of alkylated hydroxy substituted aromatic compounds can be formed by reacting a metal alcoholate with an alkylated hydroxy aromatic compound. The preparation of magnesium alkylphenolate by this direct type of reaction is set forth in U.S. Patent 2,610,982, issued September 16, 1952, to John W. Hutcheson. However, this prior art method contemplates the production of individual salts only, and in order to produce a mixture of salts of organic hydroxy compounds, for instance a mixture found to be useful in the previously mentioned Patent 2,674,577, each salt must be manufactured separately and thereafter combined to form a mixture.

In accordance with the present invention, a combination or mixture of metal salts of organic hydroxy compounds are formed by reacting an alloy of metals, the salts of which are desired to be combined, with an aliphatic alcohol. The product formed by this new method is a mixture of metal salts of an aliphatic alcohol. Further, in accordance with the present invention, we have found that a combination or mixture of metal salts of alkylated hydroxy aromatic compounds is formed by reacting an alkylated hydroxy aromatic compound with the mixture of metal alcoholates formed by reaction of an alloy with an aliphatic alcohol.

Two subgeneric methods are effectively employed in order to prepare a mixture of metal salts of alkylated hydroxy aromatic compounds. In one, an alloy of metals is first reacted with an aliphatic alcohol to form a mixture of metal alcoholates. This method of forming a mixture of metal alcoholates is novel and as such is set forth as the first part of our invention. The alcoholates are then mixed with an alkylated hydroxy aromatic compound in mineral lubrating oil and reacted to produce a lube oil concentrate of a mixture of metal salts of an alkylated hydroxy aromatic compound. In the other method, the metal alloy, aliphatic alcohol, and alkylated hydroxy aromatic compound in mineral oil are mixed together simultaneously and reacted to form a concentrate containing a mixture of salts of an alkylated hydroxy aromatic compound.

Both of the above methods effectively produce the desired product although in both cases it is preferred that the reaction, insofar as the formation of the alcoholates is concerned, takes place in a catalytic reducing atmosphere such as hydrogen and methane. We have found the reaction to be particularly successful in such an atmosphere and said phenomenon might possibly be explained by the fact that hydrogen and methane have the ability to clean the surface of the metal alloy by catalytic reduction of any metallic oxide films thereon. A reaction atmosphere of methane was found to be useful in suppressing a rearrangement or decomposition reaction in some cases occurring during the formation of the mixture of metal alcoholates. Where an alloy of magesium and zinc, and methyl alcohol is used, such a decomposition of the methylates might be represented by the following equations:

$$Mg(OCH_3)_2 + CH_3OH \rightarrow MgCO_3 + 2CH_4 + H_2$$
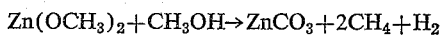
$$Zn(OCH_3)_2 + CH_3OH \rightarrow ZnCO_3 + 2CH_4 + H_2$$

It can be seen that the formation of a carbonate and the evolution of methane will be suppressed by the excess methane present during the reaction and at the same time the methane will aid in the reaction as previously stated.

The metal alloys which are useful in accordance with this invention are those formed with any of the alkali and alkaline earth metals including magnesium as one of the components and metals of the following series as another component: zinc, tin, lead, cadmium, beryllium, manganese, arsenic, antimony, bismuth, aluminum and cobalt. The preferred alloy is a zinc-magnesium alloy basis the fact that a mixture of magnesium and zinc alkylated hydroxy compounds is a superior lube oil additive.

The aliphatic alcohols useful in the present invention are those having from 1 to 3 carbon atoms, while alcohols containing four carbon atoms and more have been found to have little or no value. This in itself is somewhat surprising since in the preparation of the individual salts, aliphatic alcohols having up to 6 carbon atoms are useful and in the case of the formation of zinc phenolates by a so-called double decomposition method butyl alcohol is preferred. In the present case, however, anhydrous methyl alcohol is preferred.

The preferred type of nuclearly alkylated hydroxy aromatic compound is an alkyl phenol, prepared by alkylating phenol, cresol, xylenol or other alkyl phenol, with an olefin polymer to obtain an alkylated phenol wherein the alkyl substituents on the benzene nucleus contain a total of at least 15 carbon atoms, and preferably at least 18 carbon atoms. In the case of a mono-alkylated phenol, the olefin polymer employed is a $C_{15}$ to $C_{30}$ polymer, or any fraction thereof, so that the alkyl substituent on the benzene nucleus contains 15 to 30 carbon atoms. However, the phenol may be polyalkylated with a $C_8$ or higher olefin polymer fraction, such as dialkylated with a $C_9$ propylene polymer, whereby the alkyl substituents on the benzene nucleus contain a total of at least 16 carbon atoms and up to 60 carbon atoms or more.

In place of the nuclearly alkylated hydroxy mono-nuclear aromatic hydrocarbons mentioned above, similar nuclearly alkylated hydroxy polynuclear aromatic hydrocarbons having the hydroxyl group attached to the condensed ring can be employed, such as alkylated naphthols, wherein the alkyl substituents on the naphthalene or other polynuclear aromatic nucleus have a total of at least 15 carbon atoms. All of the foregoing nuclearly alkylated hydroxy aromatic hydrocarbon compounds consist of carbon, hydrogen and oxygen, with one benzene or condensed ring nucleus having a single hydroxyl group attached to the ring.

In addition to the compounds discussed above, the respective nuclei can also be interconnected by hydrocarbon groups in addition to the metal. For example, two mols of alkyl phenol can be condensed with one mol of formaldehyde or other aldehyde to form a compound wherein two alkyl phenol nuclei are interconnected by a methylene group when formaldehyde is employed, or other alkylene group when a higher aldehyde is employed; and the resulting compound, when neutralized to form the divalent salts, replaces the two hydrogens of the two hydroxyl groups, each attached to a different benzene nucleus, so that the two phenolate nuclei are then interconnected by both the metal and the hydrocarbon group. These latter aldehyde condensation products bear a close relationship to the simple alkylated phenols or naphthols first discussed, since their predominating functional group is still the aromatic hydroxyl.

The reaction conditions under which the process is carried out vary somewhat depending upon the reactants used; however, the following are general descriptions of the reaction conditions and procedures in accordance with the invention.

In the formation of the alcoholates, the alloy and excess anhydrous $C_1-C_3$ aliphatic alcohol are charged to a high pressure reaction vessel wherein they are heated for a period of time necessary for a complete reaction such time period ranging from 4–24 hours depending on the alloy used. The temperature is kept high enough that both metals in the alloy react to form a mixture of alcoholates. This is important since, at lower temperatures, one of the alloy components may react and the other will remain in the metallic state. The temperature range in accordance with the invention is from 150–240° C. and the temperature which must be maintained within this range in any given case would depend on the particular alloy employed. During the reaction the pressure developed is about equal to the vapor pressure of the components in the closed pressure vessel at the maintained reaction temperature. Hydrogen is evolved from the reaction of the methyl alcohol and the alloy. As was previously stated, the reaction is preferably carried out in a hydrogen or methane atmosphere so that the metals present a clean surface with which the alcohols may react. With some alloy components, such as zinc, this was found to be of extreme importance whereas with other metals it is merely a preferred condition.

For the formation of the metal salts of an alkylated hydroxy aromatic compound, the alcoholates formed in the foregoing reaction were cooled to room temperature and the alkylated hydroxy aromatic compound in mineral lubricating oil were added. The reactor was reheated from 150–250° C. without pressure and excess alcohol distilled off. The remaining substance was then stirred while heated from about 1 to 8 hours for the final reaction to go to completion. The oil concentrate of a mixture of metal salts of an alkylated hydroxy aromatic compound is then filtered to give the finished product.

In the alternative method, the reactants, alloy, excess $C_1-C_3$ aliphatic alcohol and alkylated hydroxy aromatic compound along with a mineral lubricating oil are charged to a pressure reactor capable of being agitated. The reactor is heated to a reaction temperature ranging from 150 to 240° C. for about 4 to 24 hours which develops a pressure of approximately the vapor pressure of the components in the closed vessel at the temperature of reaction. The mixture was agitated for the time necessary for a complete reaction to occur. At this time the excess alcohol was distilled off and after further agitation the oil concentrate filtered or, in the alternative, the oil concentrate was filtered immediately without distillation of the alcohol. In this method, as in the former, the temperature was kept high enough within a range of 150 to 240° C. to cause the reaction of both metal components of the alloy and the reaction is preferably carried out in a strong catalytic reducing atmosphere.

It is, of course, realized that it is necessary to obtain a proper percentage mixture of the salts in order to form a useful product. This is done by simply employing an alloy having metal components in the desired atomic ratio. For instance, an excellent mineral lubricating oil additive as set forth in previously mentioned Patent 2,674,577 requires for the preferred additive a mixture of about 1 part zinc alkyl phenolate to 2 parts magnesium alkyl phenolate. To prepare a zinc-magnesium alkyl phenolate mixture in a molar ratio of 1 to 2 in accordance with the present invention, an alloy of zinc and magnesium in an atomic ratio of about 1 to 2 respectively, is used.

The following examples demonstrate the method of formation of mixtures of metal alcoholates.

EXAMPLE I

Ten grams of an alloy containing an analyzed 58.04% zinc, 41.45% magnesium and 0.51% impurities, this percentage being approximately equivalent to a 1 to 2 atomic ratio of the zinc and magnesium metals, respectively, and 200 ml. of anhydrous methyl alcohol were charged to a 4 liter stainless steel autoclave. The autoclave was flushed 3 times with hydrogen and then heated to 200° C. for the reaction time of 16 hours. A pressure of about 500 p.s.i. was developed which was approximately the vapor pressure of the methyl alcohol. On completion of the reaction a grey-white powder was recovered a portion of which was treated with hydrochloric acid. No gas evolved, signifying a completed reaction. An analysis of the remaining mixture of magnesium and zinc methylates formed in accordance with this example was made and the results are given in Table I.

EXAMPLE II

Ten grams of the alloy of Example I and 200 ml. of anhydrous n-butanol were charged to the 4 liter stainless steel reaction vessel and subjected to the conditions and method of Example I. No evidence of a reaction was observed.

EXAMPLE III

Ten grams of the alloy of Example I and 200 ml. of anhydrous ethanol were reacted under the conditions and procedure of Example I. A grey-white powder was observed which evolved a gas quite readily when reacted with dilute hydrochloric acid. This indicated that although some salts had been formed under these conditions, the reaction had not gone to completion.

EXAMPLE IV

Ten grams of an alloy containing an analyzed 37.9% zinc, 61.3% magnesium and 0.8% impurities, this percentage being approximately equivalent to a 1 to 0.22 atomic ratio of the magnesium to zinc, and 200 ml. of anhydrous methyl alcohol were charged to a 1 liter stainless steel high pressure reactor. The alcohol in the reactor was displaced by flushing with hydrogen. The temperature in the reactor was raised to 200° C. and kept at that temperature for the reaction time of 16 hours. A pressure of approximately 500 p.s.i. was developed during the reaction. The results of an analysis of the mixture of the zinc-magnesium methylates formed in accordance with the foregoing example is given in Table I.

EXAMPLE V

Ten grams of an alloy consisting of analyzed 27.3% magnesium and 72.9% zinc which is approximately equivalent to a 1 to 1 atomic ratio of magnesium to zinc and 200 ml. of anhydrous methyl alcohol were charged to a 1 liter stainless steel type pressure reactor and reacted under the same conditions as set forth in Example IV. The results of an analysis of the mixture of magnesium and zinc methylates formed in accordance with this example is given in Table I.

EXAMPLE VI

Ten grams of an alloy consisting of an analyzed 9.8% magnesium and 90.5% zinc which is approximately equivalent to an atomic ratio of 1 to 3.4 magnesium to zinc, and 200 ml. of anhydrous methyl alcohol were charged to a 1 liter stainless steel high pressure reactor and reacted in accordance with the conditions of Example IV. The results of an analysis of the mixture of magnesium and zinc methylates formed in accordance with this example is given in Table I.

The following table shows the results of a quantitative analysis of the methylates formed in the foregoing examples. The figures under "found" represent the analyzed percentages and the figures under "calc." represent the theoretical percentages present.

*Table I*

| Example | Ash, percent | | Zinc, percent | | Magnesium, percent | | Carbon, percent | | Hydrogen, percent | |
|---|---|---|---|---|---|---|---|---|---|---|
| | found | calc. | found | calc. | found | calc. | found | calc. | found | calc. |
| I | 54.5 | 53.7 | 21.3 | 21.3 | 16.2 | 16.2 | 22.2 | 23.9 | 6.0 | 6.0 |
| II | (1) | (1) | (1) | (1) | (1) | (1) | (1) | (1) | (1) | (1) |
| III | (2) | (2) | (2) | (2) | (2) | (2) | (2) | (2) | (2) | (2) |
| IV | 52.5 | 52.2 | 23.1 | 25.0 | 13.7 | 15.0 | 23.9 | 23.9 | 6.1 | 5.9 |
| V | 53.8 | 56.8 | 29.1 | 30.3 | 11.3 | 11.35 | 21.91 | 22.5 | 5.62 | 5.63 |
| VI | 56.7 | 61.0 | 40.2 | 42.7 | 4.6 | 4.4 | 19.59 | 20.5 | 5.21 | 5.1 |

[1] No reaction took place.
[2] No analysis made.

The following examples demonstrate the methods of formation of mixtures of metal salts of alkylated hydroxy aromatic compounds.

EXAMPLE VII

Nine grams of the alloy of Example I having a mesh size of less than 50, 200 g. of anhydrous methyl alcohol, 209 g. of a distilled C–18 propylene polymer phenol and 440 grams of a naphthene distillate type base oil having a viscosity of 305.6 SUS at 100° F. were charged to a 2700 ml. high pressure hydrogenation reactor. The air in the reactor was displaced by flushing the reactor three times with hydrogen. The temperature was raised to 200° C. and the reactor was shaken for 6 hours. Thereafter, the contents of the reactor were blown into a beaker and the oil concentrate filtered. An analysis of the mixed zinc-magnesium alkyl phenolates of this example is given in Table II following the examples.

EXAMPLE VIII

Nine grams of the alloy of Example I having a mesh size of less than 50, 200 grams of anhydrous methanol, 209 grams of a C–18 still bottom polymer alkyl phenol (alkali treated) and 440 grams of a naphthene distillate type base oil having a viscosity of 305.6 SUS at 100° F. were charged to 2700 ml. high pressure hydrogenation reactor. The air in the system was flushed out three times with hydrogen and thereafter the reaction mixture was agitated for 16 hours at 200° C. After this, the methanol was distilled from the reactor without cooling. The reactor was then agitated for an additional hour at 200° C. The oil concentrate of mixed magnesium and zinc alkyl phenolates was then filtered.

An analysis of the mixed zinc-magnesium alkyl phenolates of this example will be given in Table II following the remaining examples.

EXAMPLE IX

Ten grams of the alloy of Example I having a mesh size of less than 200, and 200 ml. of anhydrous methyl alcohol were charged to a 4 liter stainless steel autoclave. The air in the autoclave was displaced by flushing a minimum of 6 times with hydrogen. The autoclave was kept at 200° C. for a period of 8 hours without agitating. It was then cooled to room temperature and 170 g. of a C–20 still bottom polymer alkylphenol along with 420 grams of a naphthene distillate type base oil having a viscosity of 305.6 SUS at 100° F. was added. Thereafter, the autoclave was reheated and the methyl alcohol distilled off between 100–150° C. The substance in the autoclave was stirred at 240° C. for 2 hours and the oil concentrate of magnesium and zinc alkyl phenolates filtered.

The analysis results are given in Table II following the examples.

EXAMPLE X

Ten grams of the alloy of Example I having a mesh size of less than 50, and 200 ml. of anhydrous methyl alcol were charged to a 4 liter stainless steel autoclave. The air in the autoclave was displaced by flushing a minimum of 6 times with hydrogen and thereafter the autoclave was kept at a temperature of 200° C. for 8 hours without agitating. It was then cooled to room temperature and 170 grams of C–20 propylene polymer phenol along with 420 grams of a naphthene distillate type base oil having a viscosity of 317.5 SUS at 100° F. was added. Thereafter, the autoclave was reheated and methyl alcohol distilled off between 100–150° C. The substance in the autoclave was stirred at 200° C. for 2 hours and the oil concentrate of magnesium and zinc alkyl phenolates filtered.

The analysis of the products of this example and the preceding examples are given in the following table.

*Table II*

| Example | Ash, percent | | Zinc, percent | | Magnesium, percent | | Ratio, Mg:Zn | Phenolate Yield, percent | | Conversion of Phenol, percent |
|---|---|---|---|---|---|---|---|---|---|---|
| | found | calc. | found | calc. | found | calc. | | Zn | Mg | |
| VII | 1.69 | 1.94 | 0.59 | 0.76 | 0.52 | 0.59 | 1:0.43 | 78 | 88 | 70 |
| VIII | 1.99 | 1.94 | 0.45 | 0.76 | 0.37 | 0.59 | 1:0.45 | 59 | 62 | 54 |
| IX | 1.65 | 2.00 | 0.60 | 0.79 | 0.62 | 0.61 | 1:0.36 | 75 | 102 | 86 |
| X | 1.79 | 2.00 | 0.70 | 0.79 | 0.63 | 0.61 | 1:0.40 | 87 | 102 | 93 |

It is seen from the above table that somewhat better yields of a mixture of metal salts of alkylated hydroxy aromatic compounds are obtained by using the procedure set forth in Examples VI and VII. Therefore such procedure is preferred.

I claim:

1. A method of producing a mixture of magnesium and zinc alcoholates comprising reacting an alloy containing magnesium and zinc with anhydrous methyl alcohol, said metals being present in the alloy in a ratio necessary to produce the desired molar ratio of the mixture of metal alcoholates, carrying out the reaction in an atmosphere of hydrogen, employing a reaction temperature within the range of from about 150 to 240° C. for a period of time ranging from about 8 to 24 hours and maintaining a pressure equal to about the vapor pressure of the alcohol at the reaction temperature.

2. A method of producing a mixture of magnesium and zinc salts of an alkylated hydroxy aromatic compound comprising reacting an alloy containing magnesium and zinc with anhydrous methyl alcohol to form a mixture of metal alcoholates, said metals being present in the alloy in a ratio necessary to produce the desired molar ratio of said salts, carrying out the reaction in an atmosphere selected from the group consisting of hydrogen and methane at a temperature ranging from about 180 to 220° C. for a period of time ranging from about 8 to 24 hours, maintaining a pressure of at least the vapor pressure of said alcohol at the reaction temperature, and thereafter reacting the mixture of metal alcoholates with an alkylated hydroxy aromatic compound.

3. A method as described in claim 2 wherein the mixture of metal alcoholates are reacted with an alkylated hydroxy aromatic compound at a temperature of from 150–250° C. for about from 1 to 8 hours.

4. A method of producing a mineral oil concentrate of a mixture of magnesium and zinc salts of alkylated hydroxy aromatic compounds comprising introducing an alloy containing magnesium and zinc, anhydrous methyl alcohol, a C–18 propylene polymer phenol, and mineral oil into a pressure reaction vessel, employing a reaction atmosphere selected from the group consisting of hydrogen and methane, and applying heat at a temperature of from about 150 to 240° C., for a period of from 6 to 24 hours.

5. A method of producing a mineral oil concentrate of a mixture of magnesium and zinc salts of alkylated hydroxy aromatic compounds comprising introducing an alloy of magnesium and zinc and anhydrous methyl alcohol into a pressure reaction vessel, employing an atmosphere selected from the group consisting of hydrogen and methane, a temperature of from about 150 to 240° C. for a period of from about 6 to 24 hours to form a mixture of magnesium and zinc alcoholates, introducing an alkylated hydroxy aromatic compound and mineral oil into the pressure reaction vessel and heating at a temperature of from 150 to 250° C. for from 1 to 8 hours.

References Cited in the file of this patent

UNITED STATES PATENTS

| | | |
|---|---|---|
| 2,584,041 | Nowak | Jan. 29, 1952 |
| 2,674,577 | McCoy et al. | Apr. 6, 1954 |
| 2,775,563 | Wiczer | Dec. 25, 1956 |